US008552945B2

(12) United States Patent
Lim

(10) Patent No.: US 8,552,945 B2
(45) Date of Patent: Oct. 8, 2013

(54) LIQUID CRYSTAL DISPLAY DEVICE AND METHOD FOR DRIVING THE SAME

(75) Inventor: Chae Wook Lim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 915 days.

(21) Appl. No.: 12/155,541

(22) Filed: Jun. 5, 2008

(65) Prior Publication Data

US 2008/0303763 A1 Dec. 11, 2008

(30) Foreign Application Priority Data

Jun. 8, 2007 (KR) ........................ 10-2007-0056000

(51) Int. Cl.

| | |
|---|---|
| ***G09G 3/36*** | (2006.01) |
| ***G09G 5/00*** | (2006.01) |
| ***G06F 3/038*** | (2013.01) |
| ***G02F 1/1343*** | (2006.01) |
| ***G02F 1/1345*** | (2006.01) |

(52) U.S. Cl.

USPC .................. 345/87; 345/90; 345/92; 345/98; 345/99; 345/100; 345/103; 345/204; 345/205; 345/211; 345/212; 349/139; 349/149

(58) Field of Classification Search

USPC ............................................................ 345/87

See application file for complete search history.

(56) References Cited

U.S. PATENT DOCUMENTS

| | | | | |
|---|---|---|---|---|
| 7,859,496 | B2 * | 12/2010 | Kim et al. | 345/87 |
| 2006/0066553 | A1 * | 3/2006 | Deane | 345/98 |
| 2006/0244704 | A1 * | 11/2006 | JaeHun | 345/92 |
| 2007/0002005 | A1 * | 1/2007 | Kim et al. | 345/103 |

* cited by examiner

*Primary Examiner* — Sumati Lefkowitz
*Assistant Examiner* — Andrew Yeretsky
(74) *Attorney, Agent, or Firm* — McKenna Long & Aldridge, LLP

(57) ABSTRACT

A liquid crystal display device and method for driving the same is described for reducing a compensating deviation of a common voltage. The liquid crystal display device includes a liquid crystal display panel; a data driver for driving data lines of the liquid crystal display panel; a gate driver for driving gate lines of the liquid crystal display panel; and a common voltage compensating unit for generating a plurality of compensating signals for compensating respective distortions of common voltages at a plurality of common regions of a common electrode of the liquid crystal display panel by using common voltages fed back from the common regions, and supplying compensating signals corresponding to each of the plurality of common regions.

6 Claims, 3 Drawing Sheets

LIQUID CRYSTAL DISPLAY DEVICE AND METHOD FOR DRIVING THE SAME

This application claims the benefit of the Korean Patent Application No. P2007-056000, filed on Jun. 8, 2007, which is hereby incorporated by reference for all purposes as if fully set forth herein.

BACKGROUND OF THE INVENTION

1. Field of the Invention

The present invention relates to display devices, and more particularly to a liquid crystal display device and a method for driving the same.

2. Discussion of the Related Art

Because of their characteristic low operation voltage and power consumption, portability, and other advantages, superthin flat panel displays, and in particular, liquid crystal display devices, have a wide and variety of applications, such as displays for notebook computers, monitors, air crafts, and space crafts.

A typical liquid crystal display device is provided with a liquid crystal display panel, and a driving circuit for driving the liquid crystal display panel. The liquid crystal display panel has a color filter substrate and a thin film transistor substrate bonded together, and a liquid crystal layer injected into a space between the bonded two substrates. The thin film transistor substrate has a plurality of gate lines that cross a plurality of data lines to define a matrix of pixel regions, pixel electrodes each formed on a respective pixel region, and a plurality of thin film transistors each switched in response to a gate line signal for transmitting a data line signal to a pixel electrode. The color filter substrate has a black matrix for that blocks lights incident on portions of the liquid crystal display panel other that the pixel regions, a R, G, B color filter layer for expressing a color, and a common electrode for forming an electric field together with the pixel electrode.

The driving circuit for driving the liquid crystal display panel has a gate driver, a data driver, a timing control unit for controlling the gate driver and the data driver, and a common voltage generating unit for supplying a common voltage to the liquid crystal display panel.

The liquid crystal display device displays an image by using a difference of transmissivities of lights corresponding to an orientation of liquid crystal molecules. The orientation of the liquid crystal molecules is controlled by controlling an electric field between the two substrates of the liquid crystal display panel.

The common voltage generating unit generates a common voltage Vcom by using a voltage of a power source of a DC/DC converting unit at the liquid crystal display panel for driving the liquid crystal display panel. The common voltage Vcom is supplied to the common electrode at the liquid crystal display panel. A parasitic capacitance is formed between the common electrode of the color filter substrate and the data lines of the thin film transistor substrate.

When a data signal value between the data lines changes sharply, the parasitic capacitance causes a ripple at the common voltage Vcom supplied to the common electrode. The ripple distorts the common voltage Vcom, and causes cross talk when the distorted common voltage is supplied to the liquid crystal display panel. To eliminate the cross talk, a common voltage compensating unit is provided for supplying a compensated common voltage to the liquid crystal display panel.

However, the distortion of the common voltage Vcom at a center of the common electrode is different from the distortion of the common voltage Vcom at a periphery of the common electrode of the liquid crystal display panel due to difference of load characteristics and the like. That is, the distortion of the common electrode voltage that occurs in a large area liquid crystal display panel or due to a resistance of the common electrode is different for each portions of the common electrode of the liquid crystal display panel. In particular, the difference in distortion voltage may be great between the center and the periphery.

Consequently, even if the common voltage Vcom compensating unit supplies a compensated common voltage to the liquid crystal display panel, the distortion of the common voltage Vcom can not be overcome due to a variation in the distortion between the center and the periphery.

SUMMARY OF THE INVENTION

Accordingly, the present invention is directed to a liquid crystal display device and a method for driving the same that substantially obviates one or more of the problems due to limitations and disadvantages of the related art.

An advantage of the present invention is to provide a liquid crystal display device and a method for driving the same, which can reduce a compensating deviation of a common voltage.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, a liquid crystal display device includes: a liquid crystal display panel; a data driver for driving data lines of the liquid crystal display panel; a gate driver for driving gate lines of the liquid crystal display panel; and a common voltage compensating unit for generating a plurality of compensating signals for compensating respective distortions of common voltages at a plurality of common regions of a common electrode of the liquid crystal display panel by using common voltages fed back from the common regions, and supplying compensating signals corresponding to each of the plurality of common regions.

In another aspect of the present invention, a method of driving a liquid crystal display device includes: feeding common voltages back to a common voltage compensator from a plurality of common regions of a common electrode of a liquid crystal display panel; generating a plurality of compensating signals by using the common voltages fed back to the common voltage compensator for compensating distorted components of the common voltages; and supplying each of the compensating signals to corresponding ones of the plurality of common regions.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to the embodiments of the present invention, examples of which are illustrated in the accompanying drawings. Wherever possible, the same reference numbers will be used throughout the drawings to refer to the same or like parts.

Figure 1:
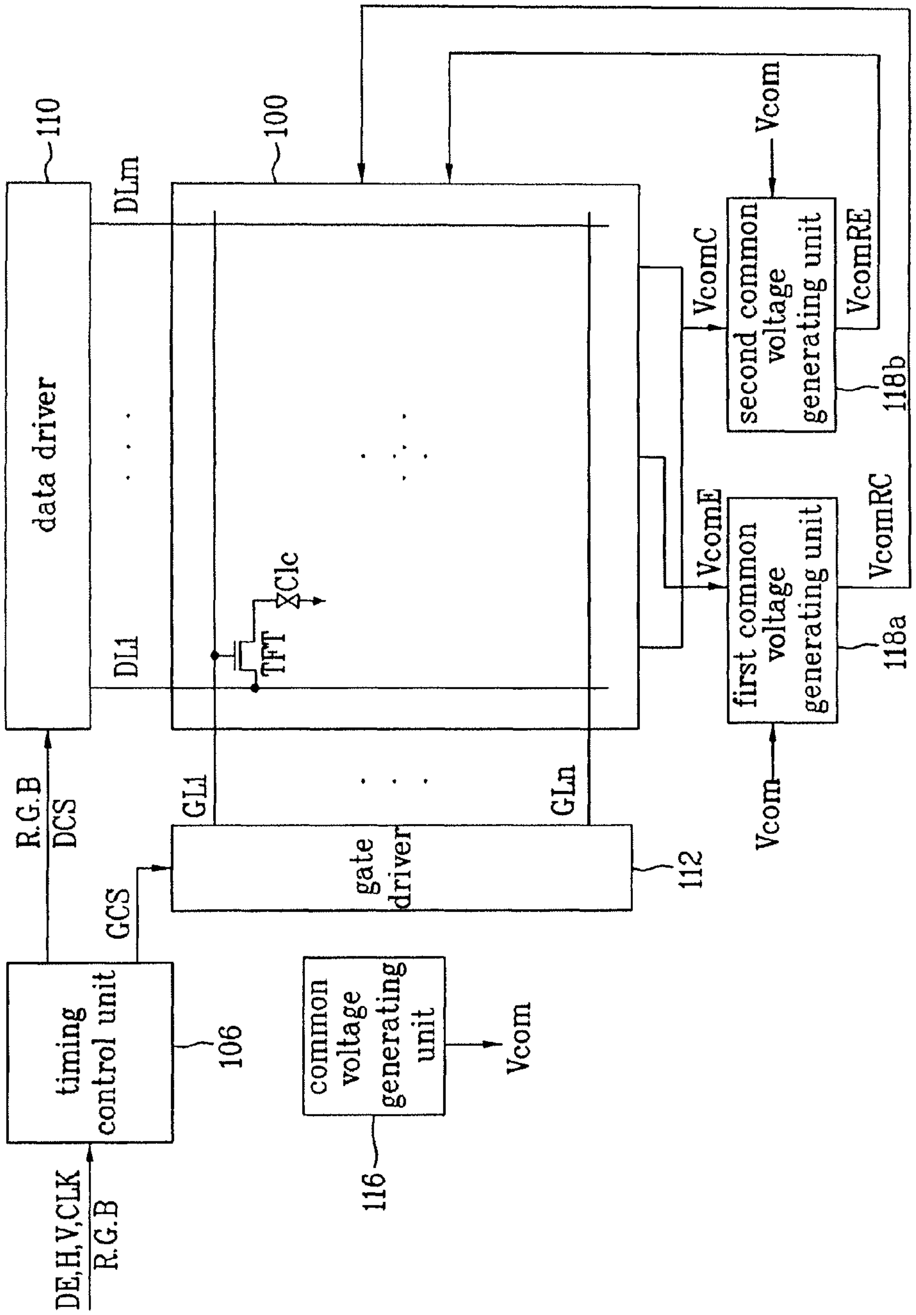
FIG. 1 is a block diagram of a liquid crystal display device in accordance with an embodiment of the present invention.

FIG. 1 is a block diagram of a liquid crystal display device in accordance with a first embodiment of the present invention.

Referring to FIG. 1, the liquid crystal display device includes a liquid crystal display panel 100, a data driver 110 for supplying a data voltage to data lines DL1 to DLm of the liquid crystal display panel 100, a gate driver 112 for driving gate lines GL1 to GLn of the liquid crystal display panel 100 in succession, a timing control unit 106 for controlling the data driver 110 and the gate driver 112, a common voltage generating unit 116 for generating a common voltage for driving the liquid crystal display panel 100, and first and second common voltage compensating units 118*a* and 118*b* for compensating for distortion of the common voltage Vcom.

Figure 3:
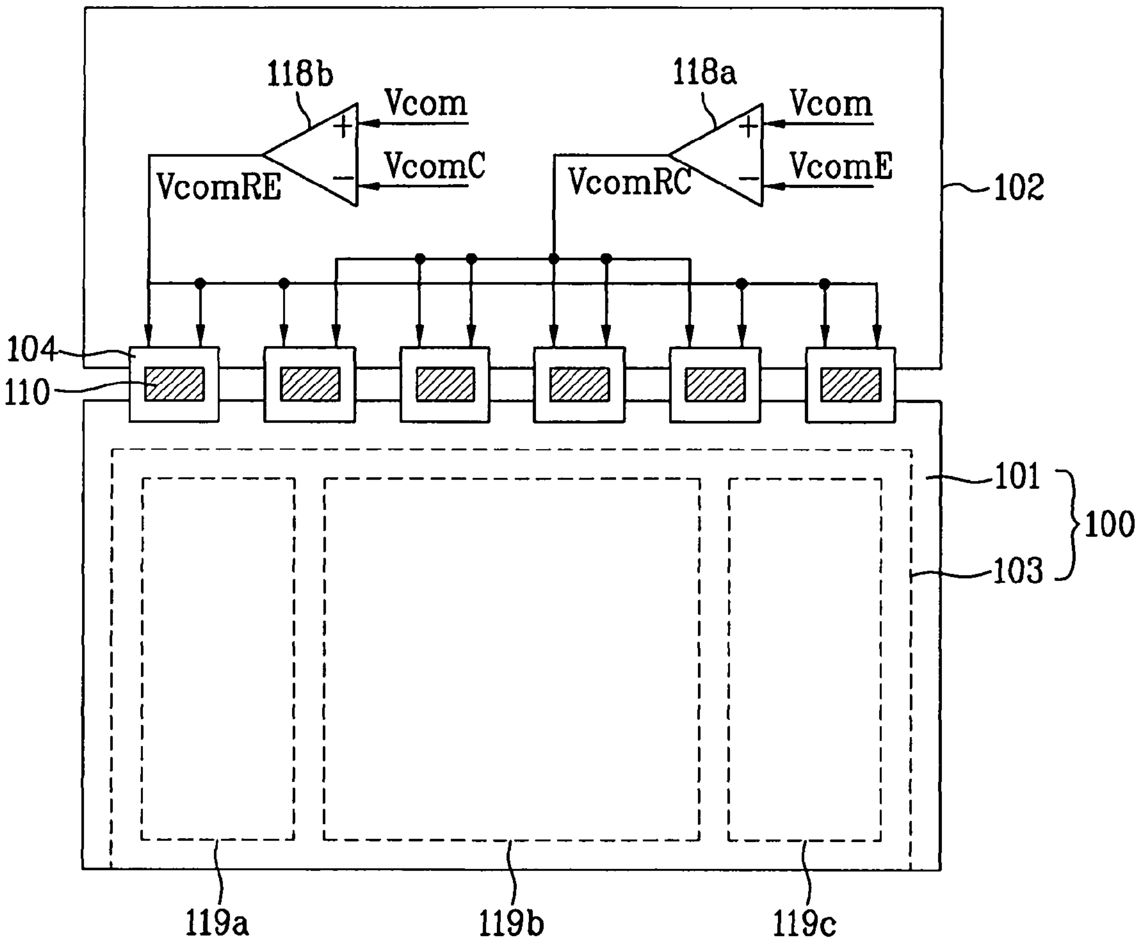
FIG. 3 is schematic diagram illustrating a liquid crystal display device including a common voltage compensating unit in accordance with a second embodiment of the present invention.

Referring to FIG. 3, the liquid crystal display panel 100 includes a thin film transistor TFT substrate 101 having a plurality of gate lines GL1 to GLn that cross data lines DL1 to DLm, a color filter substrate 103 having the common electrode, and a liquid crystal layer injected or otherwise disposed between the two substrates.

The data driver 110 supplies a data voltage of one horizontal line to the data lines DL1 to DLm at every horizontal period H1, H2, . . . in response to a data control signal DCS from the timing control unit 106. Particularly, the data driver 110 converts a digital data signal R, G, B from the timing control unit 106 to an analog data signal and supplies the analog data signal to the data lines DL1 to DLm.

The gate driver 112 sequentially supplies a gate high voltage VGH to the gate lines GL1 to GLn in response to a gate control signal GCS from the timing control unit 106.

The timing control unit 106 receives driving signals, such as a data enable signal DE, a vertical synchronizing signal V, a horizontal synchronizing signal H, and a clock signal CLK required for driving the liquid crystal display panel and an image signal R, G, B supplied from a system external to the liquid crystal display device. The timing control unit 106 aligns the supplied image signal R, G, B into a format suitable for driving the liquid crystal display panel 100, supplies the aligned signal to the data driver 110, and controls the data driver and the gate driver 110 and 112 by using a gate control signal GCS and a data control signal DCS generated from the external synchronizing signals CLK, H, and V.

The common voltage generating unit 116 supplies a DC voltage having a constant voltage level, i.e., a common voltage Vcom to the first and second common voltage compensating units 118*a* and 118*b* for a first frame period for use as reference voltages for the first and second common voltage compensating units 118*a* and 118*b*.

The first and second common voltage compensating units 118*a* and 118*b* supply a plurality of compensating signals to relevant portions of the common electrode for compensating for the distortion of the common voltage Vcom by using the common voltage Vcom from the common voltage generating unit 116 and common voltages VcomC and VcomE fed back from portions of the common electrode of the liquid crystal display panel 100.

The first and second common voltage compensating units 118*a* and 118*b* will be described in more detail with reference to the drawings.

Figure 2:
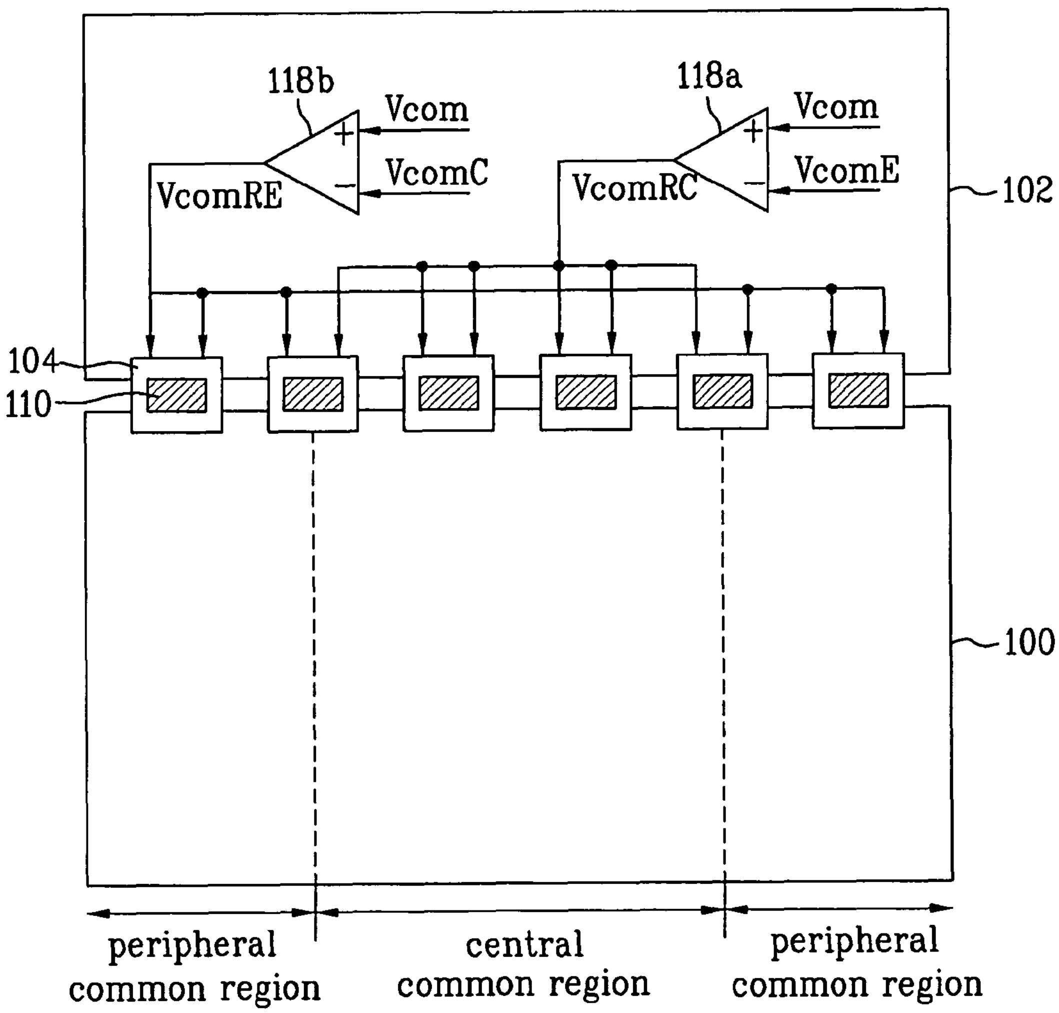
FIG. 2 is schematic diagram illustrating a liquid crystal display device including a common voltage compensating unit in accordance with a first embodiment of the present invention.

FIG. 2 is a schematic diagram of a liquid crystal display device including a common voltage compensating unit in accordance with a first embodiment of the present invention.

Referring to FIG. 2, the common voltage compensating units 118*a* and 118*b* are in a data printed circuit board (PCB) 102 connected to the liquid crystal display panel through a data tape carrier package (TCP) 104. The data driver 110 is mounted to the data TCP 104.

The common electrode of the liquid crystal display panel is parallel to either the data lines or the gate lines. The common electrode has a central common region and a peripheral common region that are spaced apart from each other.

The first voltage compensating unit 118*a* is an Op-Amp, having an inverting input terminal (−) that receives a peripheral common voltage VcomE fed back from the peripheral common region of the common electrode of the liquid crystal display panel 100 or a gate low voltage VGL supplied thereto, and a non-inverting input terminal (+) that receives the common voltage Vcom generated at the common voltage generating unit 116 supplied thereto. A central compensating signal VcomRC output from the first common voltage compensating unit 118*a* is a compensated signal having a 180° phase difference from the peripheral common voltage VcomE fed back and supplied to the inverting input terminal (−). The central compensating signal VcomRC is supplied to the central common region of the common electrode of the liquid crystal display panel 100. That is, the first common voltage compensating unit 118*a* supplies the central compensating signal VcomRC which is compensated for the common voltage VcomE fed back from the peripheral common region of the common electrode of the liquid crystal display panel for a first frame period to the central common region of the common electrode of the liquid crystal display panel 100. Thus, by supplying the central compensating signal VcomRC which has the 180° phase difference from the peripheral common voltage VcomE to the central common region of the common electrode of the liquid crystal display panel 100, the ripple taken place at the central common region of the common electrode can be eliminated without any compensating deviation. Eventually, the distortion of the common voltage Vcom caused by the ripple can be prevented at the central common region of the common electrode of the liquid crystal display panel 100 in the next frame.

The second voltage compensating unit 118*b* is another Op-Amp having an inverting input terminal (−) that receives a central common voltage VcomC fed back from the central common region of the common electrode of the liquid crystal display panel 100 supplied thereto, and a non-inverting input terminal (+) that receives the common voltage Vcom generated at the common voltage generating unit 116 supplied thereto. A peripheral compensating signal VcomRE from the second common voltage compensating unit 118*b* is a compensated signal having a 180° phase difference from the central common voltage VcomC fed back and supplied to the inverting input terminal (−). The peripheral compensating signal VcomRE is supplied to the peripheral common region of the common electrode of the liquid crystal display panel 100. That is, the second common voltage compensating unit 118*b* supplies the peripheral compensating signal VcomRC which is compensated for the common voltage VcomC fed back from the central common region of the liquid crystal display panel 100 for the first frame period to the peripheral common region of the common electrode of the liquid crystal display panel 100. Thus, by supplying the peripheral compensating signal VcomRE which has the 180° phase difference from the central common voltage VcomC to the peripheral common region of the common electrode of the liquid crystal display panel 100, the ripple taken place at the peripheral common region of the common electrode can be eliminated without any compensating deviation from the central common region. Eventually, the distortion of the common voltage Vcom caused by the ripple can be prevented at the peripheral common region of the common electrode of the liquid crystal display panel 100 in the next frame period.

Thus, the compensating deviation taken place between the central common region and the peripheral common region of the liquid crystal display panel 100 can be reduced as the first common voltage compensating unit 118*a* provides the central compensating signal VcomRC compensated for the common voltage VcomE distorted at the peripheral common region of the common electrode of the liquid crystal display panel 100 to the central common region of the common electrode of the liquid crystal display panel 100 and the second common voltage compensating unit 118*b* provides the peripheral compensating signal VcomRE compensated for the common voltage VcomC distorted at the central common region of the common electrode of the liquid crystal display panel 100 to the peripheral common region of the common electrode of the liquid crystal display panel 100.

A liquid crystal display device in accordance with a second embodiment of the present invention is identical to the embodiment illustrated in FIG. 2, except that the common electrode is divided. Therefore, the same reference numerals will be used for those components which are identical to those of FIG. 2, and a detailed description of components identical to those shown in FIG. 2 will be omitted.

FIG. 3 is a schematic diagram of a liquid crystal display device including a common voltage compensating unit in accordance with a second embodiment of the present invention.

Referring to FIG. 3, in the liquid crystal display device in accordance with a second embodiment of the present invention, the thin film transistor substrate 101 of the liquid crystal display panel 100 is identical to the foregoing embodiment, while the common electrode of the color filter substrate 103 includes a peripheral common region having a left portion 119*a* and a right portion 119*c*, and a central common region 119*b*. Common voltages different from one another are generated for the right and left portions of the peripheral common region and the central common region from a common voltage Vcom supplied by the common voltage generating unit 116. That is, the central common region 119*b* of the common electrode is compensated by a central compensating signal VcomRC from the first common voltage compensating unit 118*a*, and the peripheral common region having the left portion 119*a* and the right portion 119*c* of the common electrode are compensated by a peripheral compensating signal VcomRE from the second common voltage compensating unit 118*b*. The first and second common electrode compensating units 118*a* and 118*b* are identical to the foregoing embodiment.

That is, the first common voltage compensating unit 118*a* supplies the central compensating signal VcomRC compensated for the common voltage VcomE distorted at the peripheral common region of the left portion 119*a* and the right portion 119*c* of the common electrode to the central common region 119*b* of the common electrode. The second common voltage compensating unit 118*b* supplies the peripheral compensating signal VcomRE compensated for the common voltage VcomC distorted at the central common region 119*b* of the common electrode to the peripheral common region of the left portion 119*a* and the right portion 119*c* of the common electrode. Thus, the compensating voltage deviation between the central common region and the peripheral common regions of the common electrode of the liquid crystal display panel 100 can be reduced or eliminated.

As has been described, the liquid crystal display device and the method for driving the same of the present invention have the following advantages.

Because the plurality of common voltage compensating units can reduce compensating deviations among portions of the common electrode of the liquid crystal display panel, a stable image can be provided.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:

a liquid crystal display panel including a common electrode containing left and right peripheral common regions and a central common region between the left and right peripheral common regions;

a data driver for driving data lines of the liquid crystal display panel;

a gate driver for driving gate lines of the liquid crystal display panel; and a common voltage compensating unit for generating compensating signals for compensating respective distortions of common voltages at the left and right peripheral common regions and compensating signals for compensating distortions of common voltages at the central common region by using common voltages fed back from the central and left and right peripheral common regions respectively, and supplying compensating signals corresponding to each of the plurality of common regions, wherein the common voltage compensating unit includes:

a first common voltage compensating unit for compensating only the central common region based on a distortion component of a peripheral common voltage fed back from only the left and right peripheral common regions, and a second common voltage compensating unit for compensating only the left and right peripheral common regions based on a distortion component of a central common voltage fed back from only the central common region.

2. The device of claim 1, wherein the common regions of the common electrode are parallel to either the data lines or the gate lines.

3. The device of claim 2, wherein the plurality of common regions are spaced from one another.

4. The device of claim 1, wherein the first common voltage compensating unit generates a central compensating signal by inverting and amplifying a distortion component of the peripheral common voltage fed back from the left and right peripheral common regions, and the second common voltage compensating unit generates a peripheral compensating signal by inverting and amplifying a distortion component of the central common voltage fed back from the central common region.

5. A method for driving a liquid crystal display device including a common electrode containing left and right peripheral common regions and a central common region between the left and right peripheral common regions comprising:

feeding common voltages back to a common voltage compensator from the central and peripheral common regions respectively;

generating compensating signals for compensating distortions of common voltages at the left and right peripheral common regions and compensating signals for compensating distortions of common voltages at the central common region by using the common voltages fed back from the central and peripheral common regions respectively to the common voltage compensator for compensating distorted components of the common voltages; and supplying each of the compensating signals to corresponding ones of the plurality of common regions, wherein generating a plurality of compensating signals includes:

inverting and amplifying using a distortion component of the peripheral common voltage fed back from only the left and right peripheral common regions to a first common voltage compensating unit to generate a central compensating signal and applying the central compensating signal to only the central common region, and inverting and amplifying using a distortion component of the central common voltage fed back from only the central common region to a second common voltage compensating unit to generate a peripheral compensating signal and applying the peripheral compensating signal to only the left and right peripheral common regions.

6. The method as claimed in claim 5, wherein feeding common voltages back to a common voltage compensator includes:

feeding the common voltage from the left and right peripheral common regions back to the first common voltage compensating unit, and feeding the common voltage from the central common region back to the second common voltage compensating unit.

* * * * *